US007254618B1

(12) United States Patent
Swenson et al.

(10) Patent No.: US 7,254,618 B1
(45) Date of Patent: Aug. 7, 2007

(54) SYSTEM AND METHODS FOR AUTOMATIC DSP PROCESSING

(75) Inventors: Steven E. Swenson, Redmond, WA (US); Theodore Calhoun Tanner, Jr., Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 921 days.

(21) Appl. No.: 09/904,465

(22) Filed: Jul. 13, 2001

Related U.S. Application Data (60) Provisional application No. 60/219,351, filed on Jul. 14, 2000.

(51) Int. Cl.
G06F 15/16 (2006.01)
G10H 7/00 (2006.01)
A63H 5/00 (2006.01)

(52) U.S. Cl. .................... 709/217; 84/609; 707/104.1

(58) Field of Classification Search ............... 709/223, 709/231, 217; 84/600, 615, 668, 609, 647, 84/648; 707/104.1, 102, 10, 1; 704/255; 381/61

See application file for complete search history.

(56) References Cited

U.S. PATENT DOCUMENTS

| | | | | |
|---|---|---|---|---|
| 5,864,868 A * | 1/1999 | Contois | ................... | 707/104.1 |
| 5,918,223 A * | 6/1999 | Blum et al. | .................... | 707/1 |
| 6,389,467 B1 * | 5/2002 | Eyal | ........................... | 709/223 |
| 6,393,430 B1 * | 5/2002 | Van Ryzin | ............... | 707/104.1 |
| 6,441,291 B2 * | 8/2002 | Hasegawa et al. | ............ | 84/609 |
| 6,526,411 B1 * | 2/2003 | Ward | .......................... | 707/102 |
| 6,633,845 B1 * | 10/2003 | Logan et al. | ............... | 704/255 |
| 6,657,116 B1 * | 12/2003 | Gunnerson | ................... | 84/615 |
| 6,657,117 B2 * | 12/2003 | Weare et al. | ................. | 84/668 |
| 6,704,738 B1 * | 3/2004 | de Vries et al. | ............. | 707/102 |
| 6,721,741 B1 * | 4/2004 | Eyal et al. | .................... | 707/10 |
| 6,748,395 B1 * | 6/2004 | Picker et al. | ............... | 707/102 |
| 6,794,566 B2 * | 9/2004 | Pachet | ......................... | 84/600 |
| 6,798,886 B1 * | 9/2004 | Smith et al. | .................. | 381/61 |
| 6,834,308 B1 * | 12/2004 | Ikezoye et al. | ............. | 709/231 |
| 6,842,761 B2 * | 1/2005 | Diamond et al. | ........ | 707/104.1 |
| 2001/0018858 A1 * | 9/2001 | Dwek | .......................... | 84/609 |

OTHER PUBLICATIONS

Wold et al, "Content-Based Classification Search, and Retrieval of Audio", IEEE, 1996.*

Appelbaum, M. et al., "Agile—A CAD/ CAM/ CAE Interface Language," *Society of Manufacturing Engineers: Technical Paper*, 1984, MS84-182, 1-19.

Bendix, L. et al., "CoEd—A Tool for Versioning of Hierarchical Documents," B. Magnusson (Ed.), *System Configuration Management, Proc. ECOOP '98 SCM-8 Symposium*, Brussels, Belgium, Jul. 20-21, 1998.

(Continued)

*Primary Examiner*—Jungwon Chang
(74) *Attorney, Agent, or Firm*—Woodcock Washburn LLP (57) ABSTRACT

A system and methods for automated DSP processing of media entities to create a persistent data store having DSP processed media entities is provided. In connection with a system that convergently merges perceptual and digital signal processing analysis of media entities for purposes of classifying the media entities, various means are provided to automatically DSP process media entities data for storage in persistent data store. Techniques for incorporating DSP processed media entity data into a music matching and analysis system are also included. In an illustrative implementation, the DSP processed media entity data may be generated and stored for leveraging to participating users.

20 Claims, 8 Drawing Sheets

OTHER PUBLICATIONS

Biglari-Abhari, M. et al., "Improving Binary Compatibility in VLIW Machines through Compiler Assisted Dynamic Rescheduling," *IEEE*, 2000, 386-393.

Boneh, D. et al., "Collusion-secure fingerprinting for digital data," *IEEE Trans. Information Theory*, 1998, 44(5), 1897-1905.

Bratsberg, S.E., "Unified Class Evolution by Object-Oriented Views," Pernul, G. et al. (Eds.), *Entity-Relationship Approach—ER '92. Proc. 11th International Conference on the Entity-Relationship Approach*, Karlsruhe, Germany, Oct. 7-9, 1992, 423-439.

Bresin, R. et al., "Synthesis and decoding of emotionally expressive music performance," *IEEE SMC '99 Conference Proceedings. 1999 IEEE Int'l Conf. On Systems, Man, and Cybernetics*, 1999, vol. 4, 317-322.

Camurri, A. et al., "Multi-Paradigm Software Environment for the Real-Time Processing of Sound, Music and Multimedia," *Knowledge-Based Systems*, 1994, 7(2), 114-126.

Camurri, A. et al., "Music and Multimedia Knowledge Representation and Reasoning—The Harp System," *Computer Music J.*, 1995, 19(2sum), 34-58.

Camurri, A., "Music content processing and multimedia: Case studies and emerging applications of intelligent interactive systems," *J. New Music Res.*, 1999, 28(4), 351-363.

Clamen, S.M., "Schema Evolution and Integration", *Distributed and Parallel Databases 2*, 1994, 2, 101-126.

Cohen, W.W. et al., "Web-collaborative filtering: recommending music by crawling the Web," *Computer Networks*, 2000, 33, 685-698.

Conradi, R. "Version Models for Software Configuration Management," *ACM Computing Surveys*, Jun. 1998, 30(2), 232-282.

Conradi, R. et al., "Change-Oriented Versioning: Rationale and Evaluation," *Third Int'l. Workshop—Software Engineering & Its Applications*, Dec. 3-7, 1990, Toulouse, France, pp. 97-108.

Craner, P.M., "New Tool for an Ancient Art: The Computer and Music," *Computers and Humanities*, 1991, 25, 303-313.

De Castro, C. et al., "Schema Versioning for Multitemporal Relational Databases," *Information Systems*, 1997, 22(5), 249-290.

DeRoure, D.C. et al., "Content-based navigation of music using melodic pitch contours," *Multimedia Systems*, 2000, 8, 190-200.

Drossopoulou, S. et al., "A Fragment Calculus -towards a model of Separate Compilation, Linking and Binary Compatibility," *14th Symposium on Logic in Computer Science—IEEE Computer Society*, Jul. 2-5, 1999, Los Alamitos, California, pp. 147-156.

Eisenberg, M. "Programmable applications: exploring the potential for language/interface symbiosys," *Behaviour & Information Technology*, 1995, 14(1), 56-66.

Franconi, E. et al., "A Semantic Approach for Schema Evolution and Versioning in Object-Oriented Databases," J. Lloyd et al., (Eds.), *Computational Logic—CL 2000: Proc. First Int'l. Conference*, Jul. 24-28, 2000, London, UK, pp. 1048-1062.

Gal, A. et al., "A Multiagent Update Process in a Databased with Temporal Data Dependencies and Schema Versioning," *IEEE Transactions on Knowledge and Data Engineering*, Jan./Feb. 1998, 10(1), 21-37.

Gentner, T. et al., "Perceptual classification based on the component structure of song in European starlings," *J. Acoust. Soc. Am.*, Jun. 2000, 107(6), 3369-3381.

Goddard, N.J., "Using the "C" programming language for interface control," *Laboratory Microcomputer*, Autumn 1982, 15-22.

Goldman, C.V. et al., "NetNeg: A connectionist-agent integrated system for representing musical knowledge," *Annals of Mathematics and Artificial Intelligence*, 1999, 25, 69-90.

Goldstein, T.C. et al., "The Object Binary Interface- C++ Objects for Evolvable Shared Class Libraries," *USENIX Association—Proc. of the 1994 USENIX C++ Conference*, Apr. 11-14, 1994, Cambridge, MA, 1-19.

Hori, T. et al., "Automatic music score recognition/play system based on decision based neural network," *1999 IEEE Third Workshop on Multimedia Signal Processing*, Ostermann, J. et al. (eds.), 1999, 183-184.

Kieckhefer, E. et al., "A computer program for sequencing and presenting complex sounds for auditory neuroimaging studies," *J. Neurosc. Methods*, Aug. 2000, 101(1), 43-48.

Kirk, R. et al., "Midas-Milan—an open distributed processing system for audio signal processing," *J. Audio Enginerr. Soc.*, 1996, 44(3), 119-129.

Krulwich, B., "Lifestyle finder—Intelligent user profiling using large-scale demographic data," *AI Magazine*, 1997, 18(2sum), 37-45.

Lethaby, N., "Multitasking with C++," *Proc. of the 5th Annual Embedded Systems Conference*, Oct. 5-8, 1993, Santa Clara, CA, 2, 103-120.

Lewine, D., "Certifying Binary Applications," *Proc. of the Spring 1992 EurOpen & USENIX Workshop*, Apr. 6-9, 1992, Jersey, Channel Islands, 25-32.

Li, D. et al., "Classification of general audio data for content-based retrieval," *Pattern Recogn. Letts.*, 2001, 22(5), 533-544.

Liang, R.H. et al., "Improving Conductor—A Virtual Reality System for Music Generation Based on Supervised Learning," *Displays*, 1994, 15(3), 141-147.

Logrippo, L., "Cluster analysis for the computer-assisted statistical analysis of melodies," *Computers Humanities*, 1986, 20(1), 19-33.

Moreno, P.J. et al., "Using the Fisher Kernal Method for Web Audio Classification," *2000 IEEE Int'l Conf. On Acoustics, Speech, and Signal Processing, Proceedings*, 2000, vol. 4, 2417-2420.

Morrison, I. et al., "The Design and Prototype Implementation of a "Structure Attribute" Model for Tool Interface Within an IPSE," *Microprocessing and Microprogramming*, 1986, 18, 223-240.

Oiwa, Y. et al., "Extednig Java Virtual Machine with Integer-Reference Conversion," *Concurrency: Practice and Experience*, May 2000, 12(6), 407-422.

Oussalah, C. et al., "Complex Object Versioning," *Advanced Information Systems Engineering—Proc. 9th Int'l. Conference, CaiSE'97*, Jun. 16-20, 1997, Catalonia Spain, 259-272.

Pesavento, M. et al., "Unitary Root-MUSIC with a Real-Valued Eigendecomposition: A Theoretical and Experimental Performance Study," *IEEE Transactions on Signal Processing*, May 2000, 48(5), 1306-1314.

Pirn, R., "Some Objective and Subjective Aspects of 3 Acoustically Variable Halls," *Appl. Acoustics*, 1992, 35(3), 221-231.

Proper, H.A., "Data schema design as a schema evolution process", *Data & Knowledge Engineering*, 1997, 22, 159-189.

Roddick, J.F., "A survey of schema versioning issues for database systems," *Information and Software Technology*, 1995, 37(7), 383-393.

Rose, E. et al., "Schema versioning in a temporal object-oriented data model," *Int'l. Journal of Artificial Intelligence Tools*, 1998, 7(3), 293-318.

Serra, A., "New solutions for the transmission of music. Possible methods in view of the reduction of the pass band," *Revista Espanola de Electronica*, Jul. 1976, 23(260), 34-35 (English language abstract attached).

Smith, M.W.A., "A relational database for the study and quantification of tempo directions in music," *Comput. Humanities*, 1994, 28(2), 107-116.

Speiser, J.M. et al., "Signal processing computations using the generalized singular value decomposition," *Proceedings of SPIE—The Int'l Socity for Optical Engineering. Real Time Signal Processing VII*, Bellingham, WA, 1984, 47-55.

Surveyer, J., "C+ = (C-Sharp = = Microsoft Java++)? True:False;", *Java Report*, Oct. 2000, 5 pages.

Tsotras, V. et al., "Optimal Versioning of Objects," *Eighth Int'l. Conference on Data Engineering—IEEE Computer Society*, Feb. 2-3, 1992, Tempe, Arizona, 358-365.

Urtado, C. et al., "Complex entity versioning at two granularity levels," *Information Systems*, 1998, 23(3/4), 197-216.

Wieczerzycki, W., "Advanced versioning mechanisms supporting CSCW environments," *Journal of Systems Architecture*, 1997, 43, 215-227.

Yoder, M.A. et al., "Using Multimedia and the Web to teach the theory of digital multimedia signals," *Proceedings. Frontiers in*

*Education, 1995 25th Annual Conference. Engineering Education for the 21st Century, IEEE*, Budny, D. et al. (eds.), Nov. 1-4, 1995, vol. 2, Atlanta, GA.

Zhang, T. et al., "Audio content analysis for online audiovisual data segmentation and classification," *IEEE Trans. on Speech and Audio Processing*, May 2001, 9(4), 441-457.

Zhang, T. et al., "Heuristic approach for generic audio data segmentation and annotation," *Proceedings ACM Multimedia 99*, 1999, 67-76.

* cited by examiner

SYSTEM AND METHODS FOR AUTOMATIC DSP PROCESSING

CROSS REFERENCE TO RELATED APPLICATION

This application is related to and claims priority under 35 U.S.C. § 119(e) to U.S. Provisional Patent Application Ser. No. 60/219,351 filed Jul. 14, 2000, entitled "SYSTEM AND METHOD FOR DYNAMIC PLAYLIST OF MEDIA", the contents of which are hereby incorporated by reference in their entirety. This application is also related to U.S. patent application Ser. No. 09/900,230 filed Jul. 6, 2001. This application is also related to U.S. patent application Ser. No. 09/899,490 filed Jul. 5, 2001, U.S. Pat. No. 6,545,209. This application is also related to U.S. patent application Ser. No. 09/934,071 filed Aug. 20, 2001, U.S. Pat. No. 7,035,873. This application is also related to U.S. patent application Ser. No. 09/900,059 filed Jul. 6, 2001, U.S. Pat. No. 6,910,035. This application is also related to U.S. patent application Ser. No. 09/934,774 filed Aug. 21, 2001, U.S. Pat. No. 6,913,466. This application is also related to U.S. patent application Ser. No. 09/935,349, filed Aug. 21, 2001. This application is also related to U.S. patent application Ser. No. 09/905,345 filed Dec. 2, 2003. U.S. Pat. No. 6,657,117. This application is also related to U.S. patent application Ser. No. 09/905,011 filed Jul. 13, 2001, U.S. Pat. No. 6,748,395. This application is also related to U.S. patent application Ser. No. 09/942,509 filed Aug. 29, 2001, U.S. Pat. No. 7,065,416. This application is also related to U.S. patent application Ser. No. 09/928,004 filed Aug. 10, 2001, U.S. Pat. No. 6,963,975.

FIELD OF THE INVENTION

The present invention relates to a system and methods for to realize automated DSP processing for media entities in a computing environment.

BACKGROUND OF THE INVENTION

Classifying information that has subjectively perceived attributes or characteristics is difficult. When the information is one or more musical compositions, classification is complicated by the widely varying subjective perceptions of the musical compositions by different listeners. One listener may perceive a particular musical composition as "hauntingly beautiful" whereas another may perceive the same composition as "annoyingly twangy."

In the classical music context, musicologists have developed names for various attributes of musical compositions. Terms such as adagio, fortissimo, or allegro broadly describe the strength with which instruments in an orchestra should be played to properly render a musical composition from sheet music. In the popular music context, there is less agreement upon proper terminology. Composers indicate how to render their musical compositions with annotations such as brightly, softly, etc., but there is no consistent, concise, agreed-upon system for such annotations.

As a result of rapid movement of musical recordings from sheet music to pre-recorded analog media to digital storage and retrieval technologies, this problem has become acute. In particular, as large libraries of digital musical recordings have become available through global computer networks, a need has developed to classify individual musical compositions in a quantitative manner based on highly subjective features, in order to facilitate rapid search and retrieval of large collections of compositions.

Musical compositions and other information are now widely available for sampling and purchase over global computer networks through online merchants such as Amazon.com, Inc., barnesandnoble.com, cdnow.com, etc. A prospective consumer can use a computer system equipped with a standard Web browser to contact an online merchant, browse an online catalog of pre-recorded music, select a song or collection of songs ("album"), and purchase the song or album for shipment direct to the consumer. In this context, online merchants and others desire to assist the consumer in making a purchase selection and desire to suggest possible selections for purchase. However, current classification systems and search and retrieval systems are inadequate for these tasks.

A variety of inadequate classification and search approaches are now used. In one approach, a consumer selects a musical composition for listening or for purchase based on past positive experience with the same artist or with similar music. This approach has a significant disadvantage in that it involves guessing because the consumer has no familiarity with the musical composition that is selected.

In another approach, a merchant classifies musical compositions into broad categories or genres. The disadvantage of this approach is that typically the genres are too broad. For example, a wide variety of qualitatively different albums and songs may be classified in the genre of "Popular Music" or "Rock and Roll."

In still another approach, an online merchant presents a search page to a client associated with the consumer. The merchant receives selection criteria from the client for use in searching the merchant's catalog or database of available music. Normally the selection criteria are limited to song name, album title, or artist name. The merchant searches the database based on the selection criteria and returns a list of matching results to the client. The client selects one item in the list and receives further, detailed information about that item. The merchant also creates and returns one or more critics' reviews, customer reviews, or past purchase information associated with the item.

For example, the merchant may present a review by a music critic of a magazine that critiques the album selected by the client. The merchant may also present informal reviews of the album that have been previously entered into the system by other consumers. Further, the merchant may present suggestions of related music based on prior purchases of others. For example, in the approach of Amazon.com, when a client requests detailed information about a particular album or song, the system displays information stating, "People who bought this album also bought . . . " followed by a list of other albums or songs. The list of other albums or songs is derived from actual purchase experience of the system. This is called "collaborative filtering."

However, this approach has a significant disadvantage, namely that the suggested albums or songs are based on extrinsic similarity as indicated by purchase decisions of others, rather than based upon objective similarity of intrinsic attributes of a requested album or song and the suggested albums or songs. A decision by another consumer to purchase two albums at the same time does not indicate that the two albums are objectively similar or even that the consumer liked both. For example, the consumer might have bought one for the consumer and the second for a third party having greatly differing subjective taste than the consumer. As a result, some pundits have termed the prior approach as the "greater fools" approach because it relies on the judgment of others.

Another disadvantage of collaborative filtering is that output data is normally available only for complete albums and not for individual songs. Thus, a first album that the consumer likes may be broadly similar to second album, but the second album may contain individual songs that are strikingly dissimilar from the first album, and the consumer has no way to detect or act on such dissimilarity.

Still another disadvantage of collaborative filtering is that it requires a large mass of historical data in order to provide useful search results. The search results indicating what others bought are only useful after a large number of transactions, so that meaningful patterns and meaningful similarity emerge. Moreover, early transactions tend to over-influence later buyers, and popular titles tend to self-perpetuate.

In a related approach, the merchant may present information describing a song or an album that is prepared and distributed by the recording artist, a record label, or other entities that are commercially associated with the recording. A disadvantage of this information is that it may be biased, it may deliberately mischaracterize the recording in the hope of increasing its sales, and it is normally based on inconsistent terms and meanings.

In still another approach, digital signal processing (DSP) analysis is used to try to match characteristics from song to song, but DSP analysis alone has proven to be insufficient for classification purposes. While DSP analysis may be effective for some groups or classes of songs, it is ineffective for others, and there has so far been no technique for determining what makes the technique effective for some music and not others. Specifically, such acoustical analysis as has been implemented thus far suffers defects because 1) the effectiveness of the analysis is being questioned regarding the accuracy of the results, thus diminishing the perceived quality by the user and 2) recommendations can only be made if the user manually types in a desired artist or song title from that specific website. Accordingly, DSP analysis, by itself, is unreliable and thus insufficient for widespread commercial or other use.

Accordingly, there is a need for an improved method of classifying information that is characterized by the convergence of subjective or perceptual analysis and DSP acoustical analysis criteria. This classification process requires extensive DSP processing so that media entity characteristics can be properly classified for processed media entities. With such a classification technique, it would be desirable to provide the capability to automatically perform DSP processing of media entities so as to create a persistent data store of processed media entities. It would be further desirable to provide a system and methods as a result of which participating users receive the benefit of the DSP processed media entities through a media entity distribution application. It would be still further desirable to aggregate DSP processed media entities into a persistent data store so that when new media entities are added to a universe of media entities the new media entities are automatically DSP processed and stored in the persistent data store that is made available to participating users.

SUMMARY OF THE INVENTION

In view of the foregoing, the present invention provides a system and methods for automatically performing DSP processing on media entities to create a persistent data store having DSP processed media entities. In connection with a system that convergently merges perceptual and digital signal processing analysis of media entities for purposes of classifying the media entities, the present invention also provides various means to aggregate a DSP processed media entities for use by participating users.

Other features of the present invention are described below.

BRIEF DESCRIPTION OF THE DRAWINGS

The system and methods for the automatic DSP processing of media entities are further described with reference to the accompanying drawings in which.

DETAILED DESCRIPTION OF PREFERRED EMBODIMENTS

Overview

The present invention provides a system and method whereby automated DSP processing of raw media entities is performed to create a persistent data store having DSP processed media entities. The present invention leverages the automated DSP processing to participating users through the creation of the persistent data store. In operation, a computing environment having one or more computing elements (e.g. a distributed computing environment) operates an automated DSP process that coordinates the DSP processing of media entities in the computing environment. Raw media entity data is first processed to determine which data and/or sub-set of data is to be DSP processed. After the determination phase, the present invention spawns at least one process to execute in the computing environment that will perform DSP processing on the identified data. The processed data is then stored in a persistent data store in data sets that are representative of one or more characteristics of the original raw media entity data sets. The persistent data store may be leveraged to participating users through a computing application that distributes media entities. Further, the automated DSP processing system and methods of the present invention may be incorporated into a music matching and analysis system. An exemplary music matching and analysis system is better described by co-pending commonly assigned U.S. Pat. No. 6,545,209, filed Jul. 5, 2001, entitled "Music Matching Process", which is herein incorporated by reference in its entirety.

Exemplary Computer and Network Environments

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having access to appropriate classification data.

Figure 1:
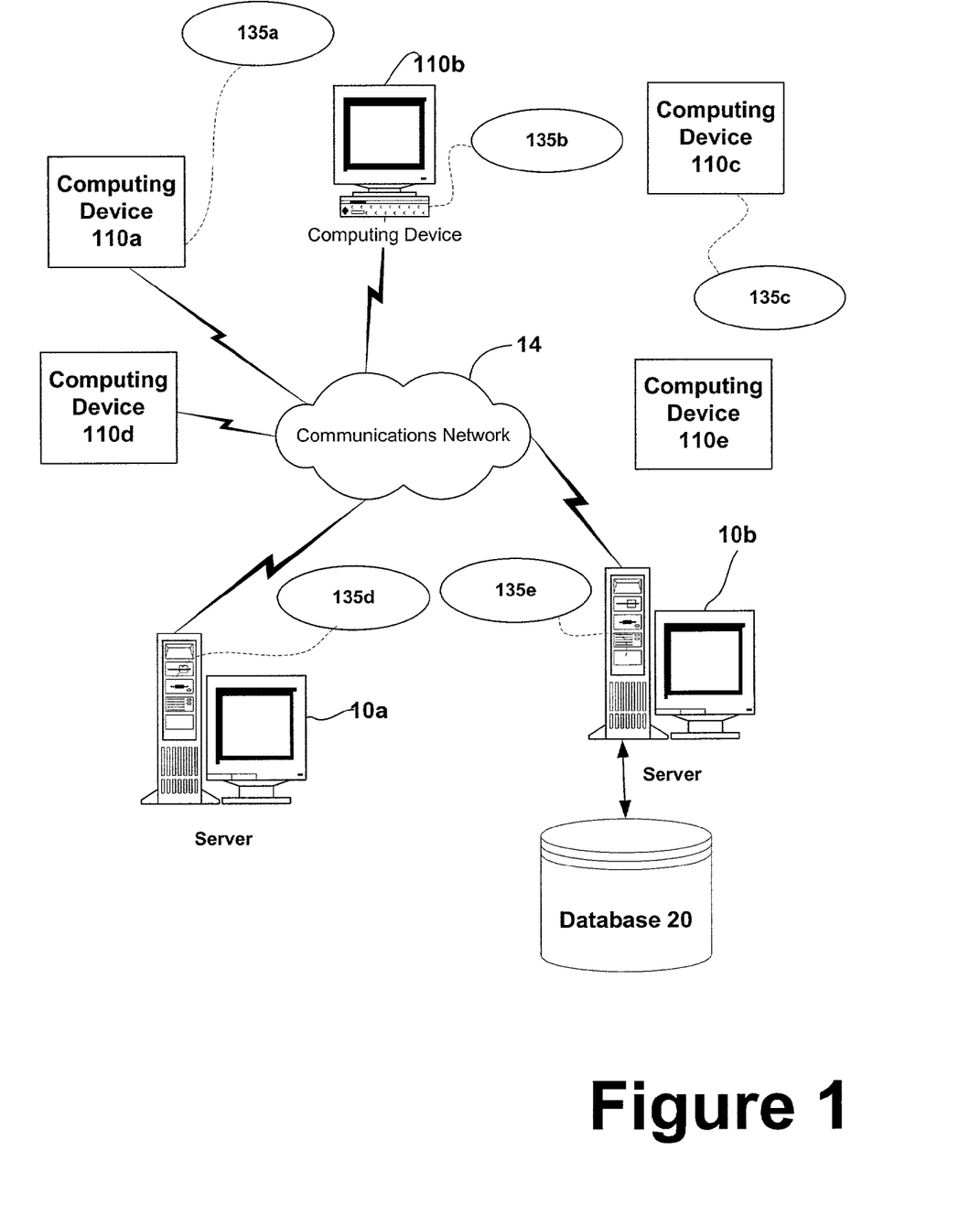
FIG. 1 is a block diagram representing an exemplary network environment in which the present invention may be implemented.

FIG. 1 illustrates an exemplary network environment, with a server in communication with client computers via a network, in which the present invention may be employed. As shown, a number of servers 10a, 10b, etc., are interconnected via a communications network 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, and the like in accordance with the present invention. It is thus contemplated that the present invention may apply to any computing device in connection with which it is desirable to provide classification services for different types of content such as music, video, other audio, etc. In a network environment in which the communications network 14 is the Internet, for example, the servers 10 can be Web servers with which the clients 110a, 110b, 110c, 110d, 110e, etc. communicate via any of a number of known protocols such as hypertext transfer protocol (HTTP). Communications may be wired or wireless, where appropriate. Client devices 110 may or may not communicate via communications network 14, and may have independent communications associated therewith. For example, in the case of a TV or VCR, there may or may not be a networked aspect to the control thereof. Each client computer 110 and server computer 10 may be equipped with various application program modules 135 and with connections or access to various types of storage elements or objects, across which files may be stored or to which portion(s) of files may be downloaded or migrated. Any server 10a, 10b, etc. may be responsible for the maintenance and updating of a database 20 in accordance with the present invention, such as a database 20 for storing classification information, music and/or software incident thereto. Thus, the present invention can be utilized in a computer network environment having client computers 110a, 110b, etc. for accessing and interacting with a computer network 14 and server computers 10a, 10b, etc. for interacting with client computers 110a, 110b, etc. and other devices 111 and databases 20.

Classification

In accordance with one aspect of the present invention, a unique classification is implemented which combines human and machine classification techniques in a convergent manner, from which a canonical set of rules for classifying music may be developed, and from which a database, or other storage element, may be filled with classified songs. With such techniques and rules, radio stations, studios and/or anyone else with an interest in classifying music can classify new music. With such a database, music association may be implemented in real time, so that playlists or lists of related (or unrelated if the case requires) media entities may be generated. Playlists may be generated, for example, from a single song and/or a user preference profile in accordance with an appropriate analysis and matching algorithm performed on the data store of the database. Nearest neighbor and/or other matching algorithms may be utilized to locate songs that are similar to the single song and/or are suited to the user profile.

Figure 2:
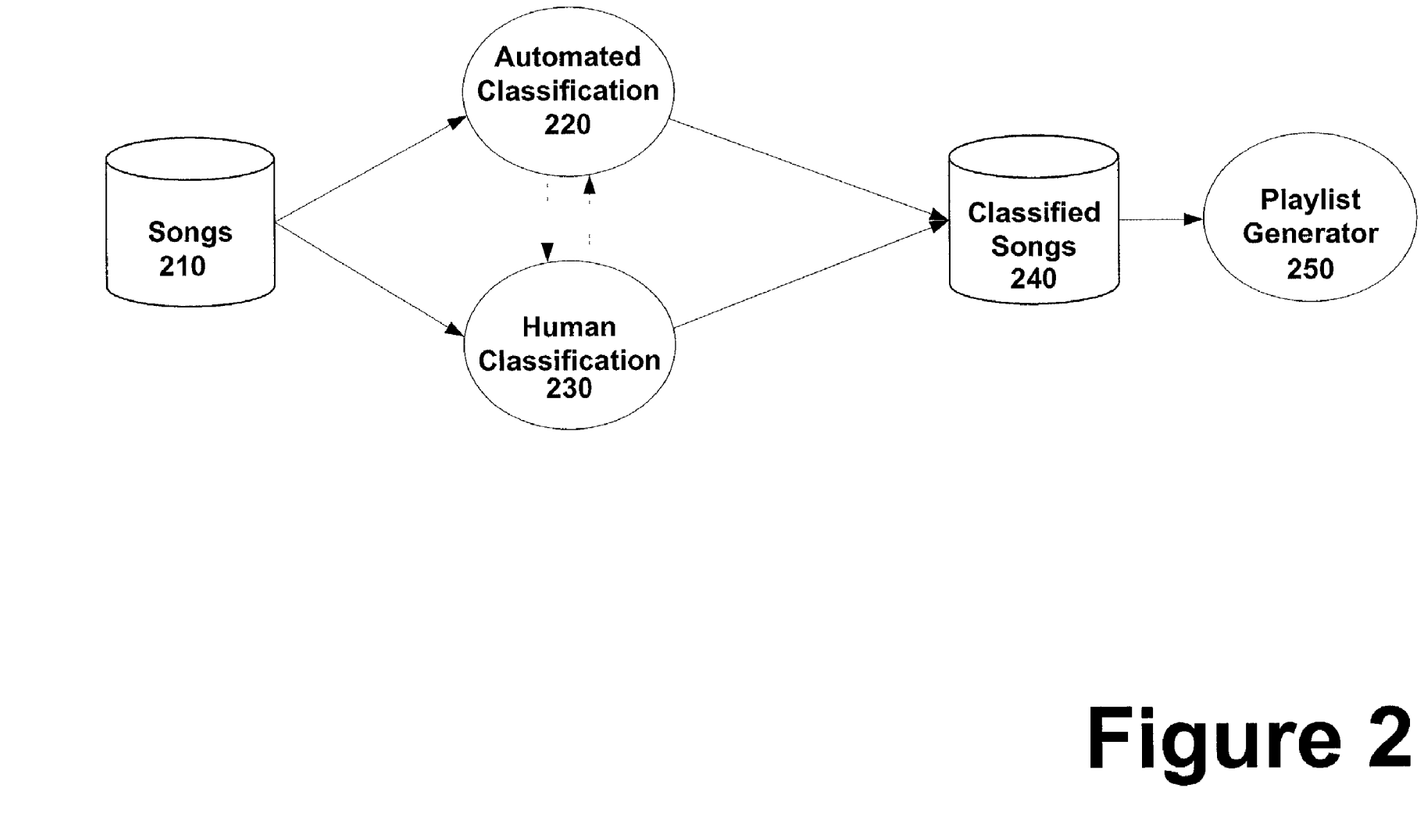
FIG. 2 is a high level block diagram representing the media content classification system utilized to classify media, such as music, in accordance with the present invention.

FIG. 2 illustrates an exemplary classification technique in accordance with the present invention. Media entities, such as songs 210, from wherever retrieved or found, are classified according to human classification techniques at 230 and also classified according to automated computerized DSP classification techniques at 220. 220 and 230 may be performed in either order, as shown by the dashed lines, because it is the marriage or convergence of the two analyses that provides a stable set of classified songs at 240. In addition, it is a goal of the classification technique to remove the human element completely, resulting in the automated system having an accuracy level to that of humans. As discussed above, once such a database of songs is classified according to both human and automated techniques, the database becomes a powerful tool for generating songs with a playlist generator 250. A playlist generator 250 may take input(s) regarding song attributes or qualities, which may be a song or user preferences, and may output a playlist, recommend other songs to a user, filter new music, etc. depending upon the goal of using the relational information provided by the invention. In the case of a song as an input, first, a DSP analysis of the input song is performed to determine the attributes, qualities, likelihood of success, etc. of the song. In the case of user preferences as an input, a search may be performed for songs that match the user preferences to create a playlist or make recommendations for new music. In the case of filtering new music, the rules used to classify the songs in database 240 may be leveraged to determine the attributes, qualities, genre, likelihood of success, etc. of the new music. In effect, the rules can be used as a filter to supplement any other decision making processes with respect to the new music.

Figure 3:
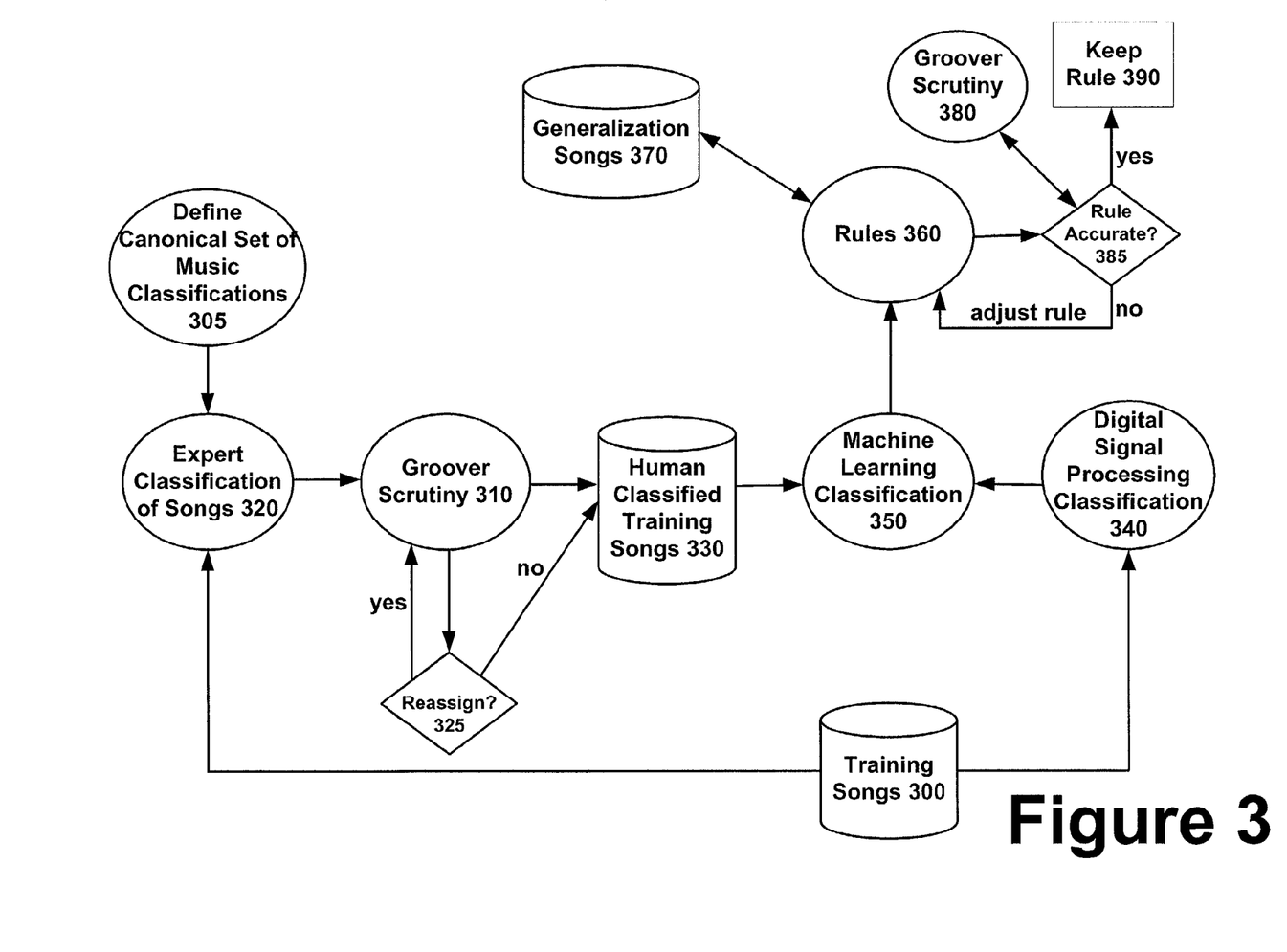
FIG. 3 is a block diagram illustrating an exemplary method of the generation of general media classification rules from analyzing the convergence of classification in part based upon subjective and in part based upon digital signal processing techniques.

FIG. 3 illustrates an embodiment of the invention, which generates generalized rules for a classification system. A first goal is to train a database with enough songs so that the human and automated classification processes converge, from which a consistent set of classification rules may be adopted, and adjusted to accuracy. First, at 305, a general set of classifications are agreed upon in order to proceed consistently i.e., a consistent set of terminology is used to classify music in accordance with the present invention. At 310, a first level of expert classification is implemented, whereby experts classify a set of training songs in database 300. This first level of expert is larger in number that a second level of expert, termed herein a groover, and in theory has less expertise in classifying music than the second level of expert or groover. The songs in database 300 may originate from anywhere, and are intended to represent a broad cross-section of music. At 320, the groovers implement a second level of expert (e.g. "Q.A." type) classification. There is a training process in accordance with the invention by which groovers learn to consistently classify music, for example to 92-95% accuracy. The groover scrutiny reevaluates the classification of 310, and reclassifies the music at 325 if the groover determines that reassignment should be performed before storing the song in human classified training song database 330.

Before, after or at the same time as the human classification process, the songs from database 300 are classified according to digital signal processing (DSP) techniques at 340. Exemplary classifications for songs include, inter alia, tempo, sonic, melodic movement and musical consonance characterizations. Classifications for other types of media, such as video or software are also contemplated. The quantitative machine classifications and qualitative human classifications for a given piece of media, such as a song, are then placed into what is referred to herein as a classification chain, which may be any type of machine-learning component (e.g. an array or other list of vectors wherein each vector contains the machine and human classification attributes assigned to the piece of media). Machine learning classification module 350 marries the classifications made by humans and the classifications made by machines, and in particular, creates a rule when a trend meets certain criteria. For example, if songs with heavy activity in the frequency spectrum at 3 kHz, as determined by the DSP processing, are also characterized as 'jazzy' by humans, a rule can be created to this effect. The rule would be, for example: songs with heavy activity at 3 kHz are jazzy. Thus, when enough data yields a rule, machine learning classification module 350 outputs a rule to rule set 360. While this example alone may be an oversimplification, since music patterns are considerably more complex, it can be appreciated that certain DSP analyses correlate well to human analyses.

However, once a rule is created, it is not considered a generalized rule. The rule is then tested against like pieces of media, such as song(s), in the database 370. If the rule works for the generalization song(s) 370, the rule is considered generalized. The rule is then subjected to groover scrutiny 380 to determine if it is an accurate rule at 385. If the rule is inaccurate according to groover scrutiny, the rule is adjusted. If the rule is considered to be accurate, then the rule is kept as a relational rule e.g., that may classify new media.

The above-described technique thus maps a pre-defined parameter space to a psychoacoustic perceptual space defined by musical experts. This mapping enables content-based searching of media, which in part enables the automatic transmission of high affinity media content, as described below.

Figure 4:
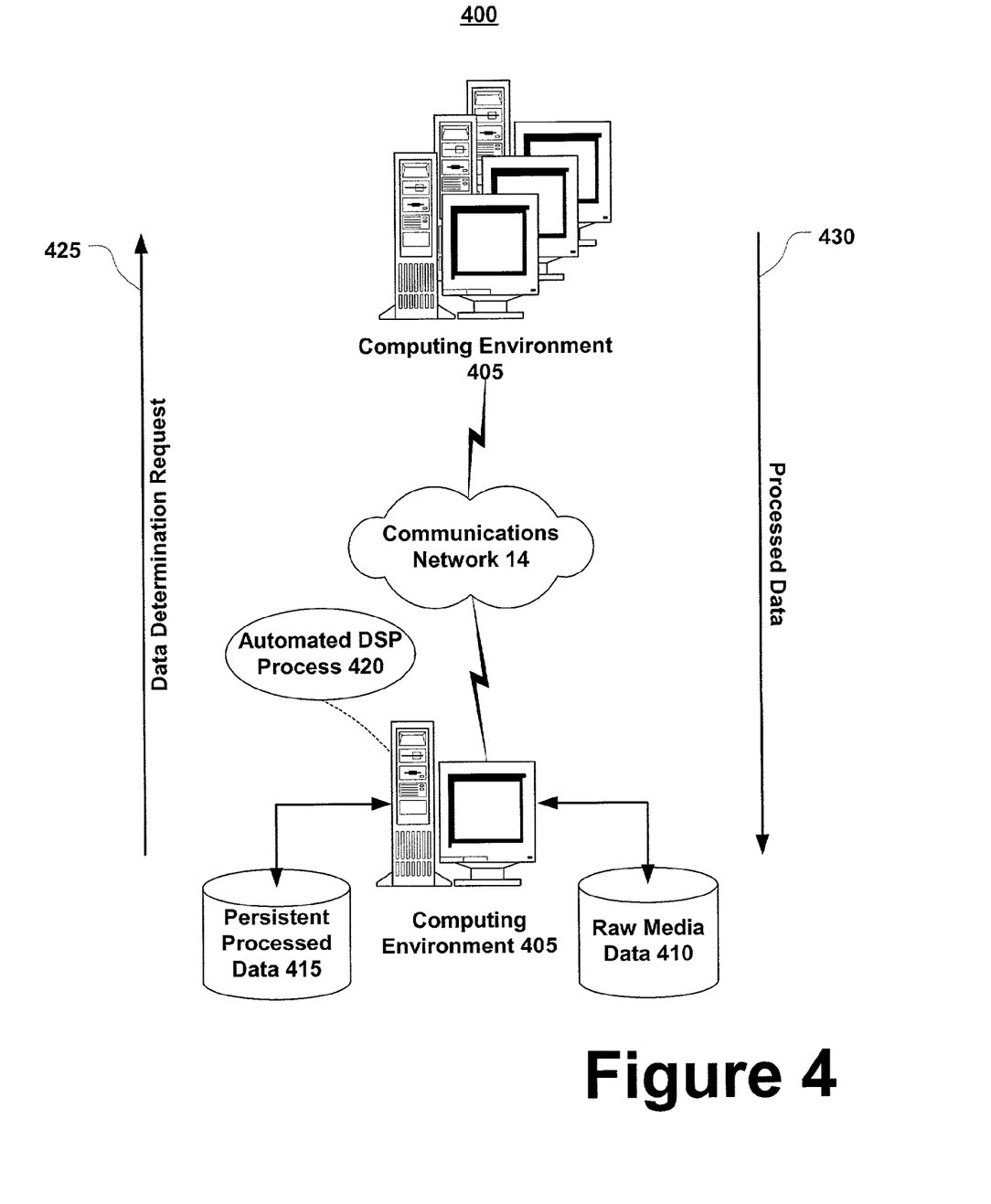
FIG. 4 is a block diagram showing the interaction of computing environment components when realizing automatic DSP processing in accordance with the present invention.

FIG. 4 shows the interplay between various components of the exemplary computing and network environments described above to realize automated DSP processing in accordance with the present invention. As shown, automated DSP processing system 400 comprises computing environment 405. In the illustrative implementation shown, computing environment 405 may be realized as a number of computer servers coupled vis a vis communications network 14. Further, computing environment 405 cooperates with automated DSP process 420, raw media data store 410, and persistent processed data store 415 to realize automated DSP processing. In operation, computing environment executes automated DSP process 420 on raw media data store 410 to identify media data that requires DSP processing. Once identified, automated DSP process 420 communicates a request 425 over communications network 14 to other cooperating computer servers of computing environment 405 to DSP process the identified raw media data. The identified raw media data is DSP processed by one or more cooperating servers and returned 430 to the originating computer server of computing environment 405. Automated DSP process 420 then aggregates the returned data for storage in persistent processed data store 415. In relation to the rules classification system of FIG. 3, persistent data store may serve to provide DSP processed media entity data consistent with digital signal processing classification element 340.

Automated DSP Processing

The present invention relates generally to automatic DSP processing of media entities to generate a persistent data store having DSP processed media entities for use by a music matching, analysis, and classification system. Generally, in operation, the present invention contemplates three phases, determination of a data set to process, processing on that data set, and aggregation of the data set to a useful form. These phases tie together under the following process, determine a data set to operate on so that for each data file execute DSP processing, and store the results in a persistent data store.

The present invention employs digital signal processing methods in an arbitrary manner to an arbitrary data set, then separately process those results into a useful form. The data process is persistent and self maintaining, processing data as it enters the system. As a result, the present invention provides a scalable system allowing the easy addition and removal of processing (e.g. addition or removal of computer servers in the exemplary computing environment) for scaling the capacity of the signal processing. The use of a persistent data store allows data to be saved for a later date for conversion into alternate formats.

Figure 5:
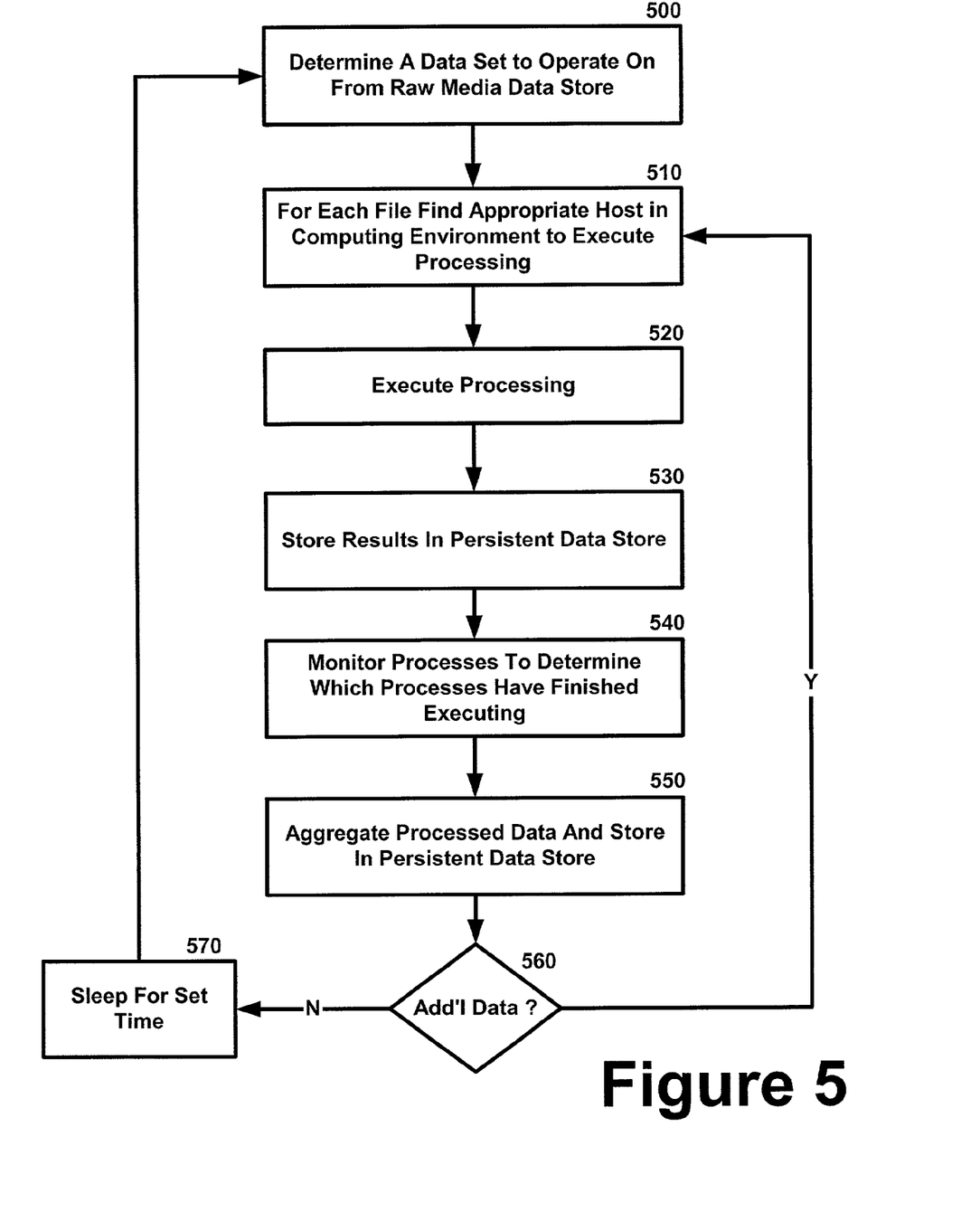
FIG. 5 is a flowchart of the processing performed to realize automated DSP processing in accordance with the present invention.

FIG. 5 illustrates the processing performed by automated DSP processing system 400 of FIG. 4. As shown processing begins at block 500 where data is identified for DSP processing. This check may be realized by performing a query on a cooperating data store (e.g. raw media data store 410 of FIG. 4), to identify media entity data in need of DSP processing. Once identified, a DSP process is spawned on an appropriate portion (e.g. one ore more cooperating computer servers) of the computing environment at block 510. The DSP processing is executed at block 520. From there, the DSP processed data is stored in a persistent data store at block 530. As more than one DSP process can be executed concurrently in the computing environment, the present invention monitors the DSP processes to determine those that are running and those that are complete at block 540. From the completed DSP processes, the DSP processed media entity data is aggregated at block 550 for storage into a persistent data store. A check is then performed at block 560 to determine if there is additional data that requires DSP processing, if there is processing reverts to block 510 and proceeds there from. However, if there is no additional data, the present invention sleeps for some specified time at block 570 and then reverts to block 500 to determine if there is media entity data in need of DSP processing.

Figure 6:
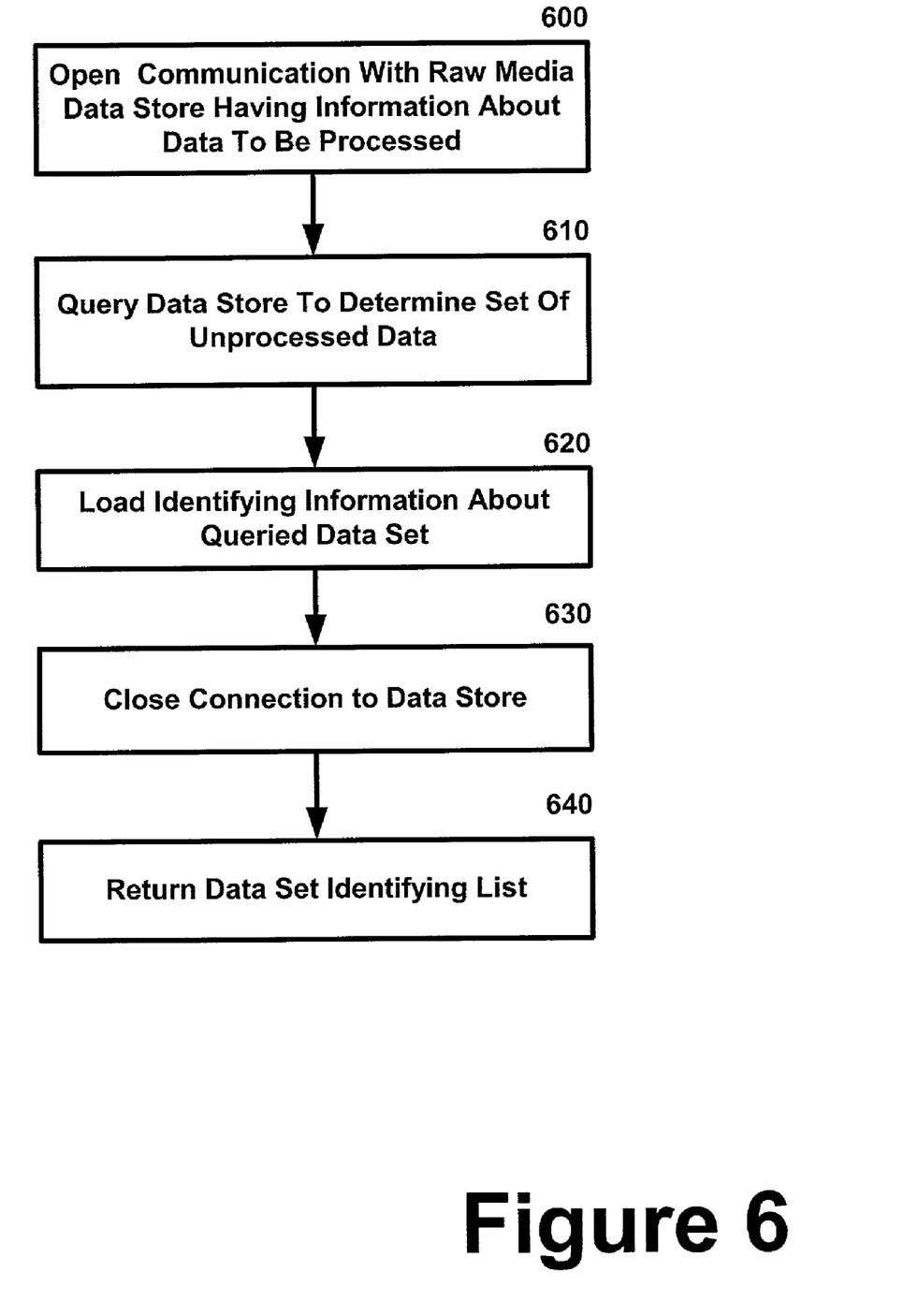
FIG. 6 is a flowchart of the processing performed to realize data determination of the automated DSP processing process in accordance with the present invention.

FIG. 6 is a flowchart showing in more detail the processing performed to identify data in need of DSP processing. As shown, processing begins at block 600 where communication is established to the data store containing DSP unprocessed media entities. A query is then performed at block 610 to determine a set of DSP unprocessed media entity data to process. Information about the identified DSP unprocessed media entity data set is then gathered for automated DSP process at block 620. The communication to the data store is terminated at block 630, and the data set identifying information is returned to automated DSP process at block 640.

Figure 7:
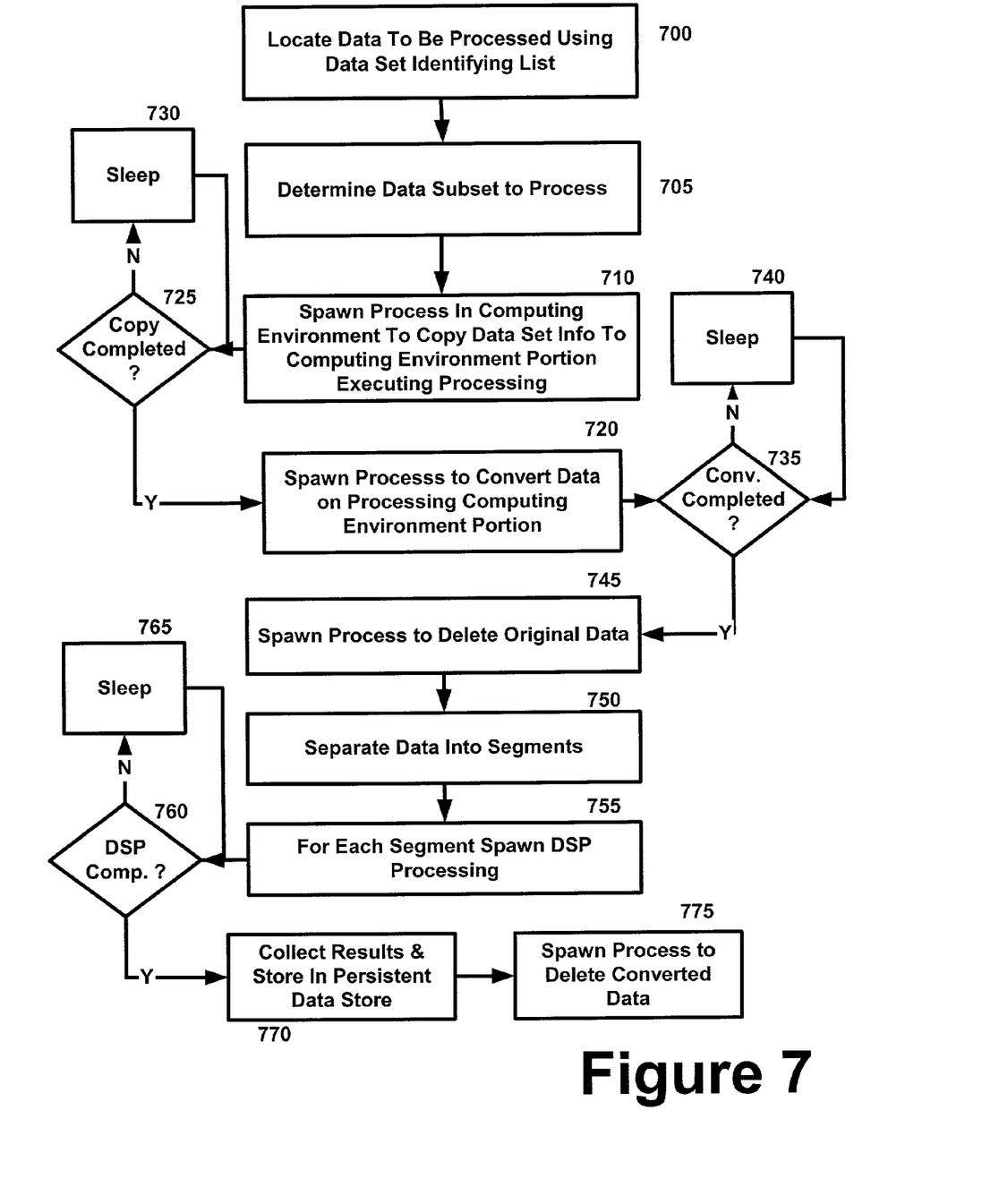
FIG. 7 is a flowchart of the processing performed to perform DSP processing in accordance with the present invention.

FIG. 7 is a flowchart of the processing performed to realize DSP operations on identified media entity data. The data to be processed is first located at block 700 using the data set identifying information generated at block 620 of FIG. 6. From there, a data subset is ascertained for processing at block 705. A process is then spawned to copy the data subset(s) into the computing environment portion executing the DSP processing (e.g. copy the data set to one or more cooperating and/or available computer servers of computing environment 405 by automated DSP process 420) at block 710. A check is then performed at block 725 to determine if all of the to-be DSP processed data has been copied. If it has not, processing proceeds to block 730 where the automated DSP processing sleeps for a pre-determined period of time. After the time has elapsed, processing reverts to block 725 and proceeds there from. However, if at block 725, it is determined that the copy has been completed, processing proceeds to block 720 where a process is spawned to convert the data (i.e. convert the data from a media entity data format to a data format consistent with DSP processing) for continued processing. A check is then performed at block 735 to determine if the conversion process is completed. If it has not completed, automated DSP processing sleeps for a pre-determined period of time at block 740. Once the period of time has elapsed, processing proceeds to block 735 and continues there from. However, if at block 735 it is determined that all of the data has been completed, processing proceeds to block 745 where automated DSP process spawns process to delete the original media entity data (i.e. the unconverted media entity data). From there the converted data is separated into data segments at block 750. For each segment, a DSP process is spawned at block 755 to process the converted data segments in accordance with DSP functions and operations. A check is then performed at block 760 to determine if the DSP processing has been completed. If it has not been completed, the automated DSP process sleeps for a pre-determined period of time at block 765. From there, processing reverts to block 760 and continues there from. However, if it is determined at block 760 that DSP processing has completed for a given data segment, processing proceeds to block 770 where, the DSP processed data is collected and stored in the persistent data store. From there, a process is spawned at block 775 to delete the converted data converted at block 720.

Figure 8:
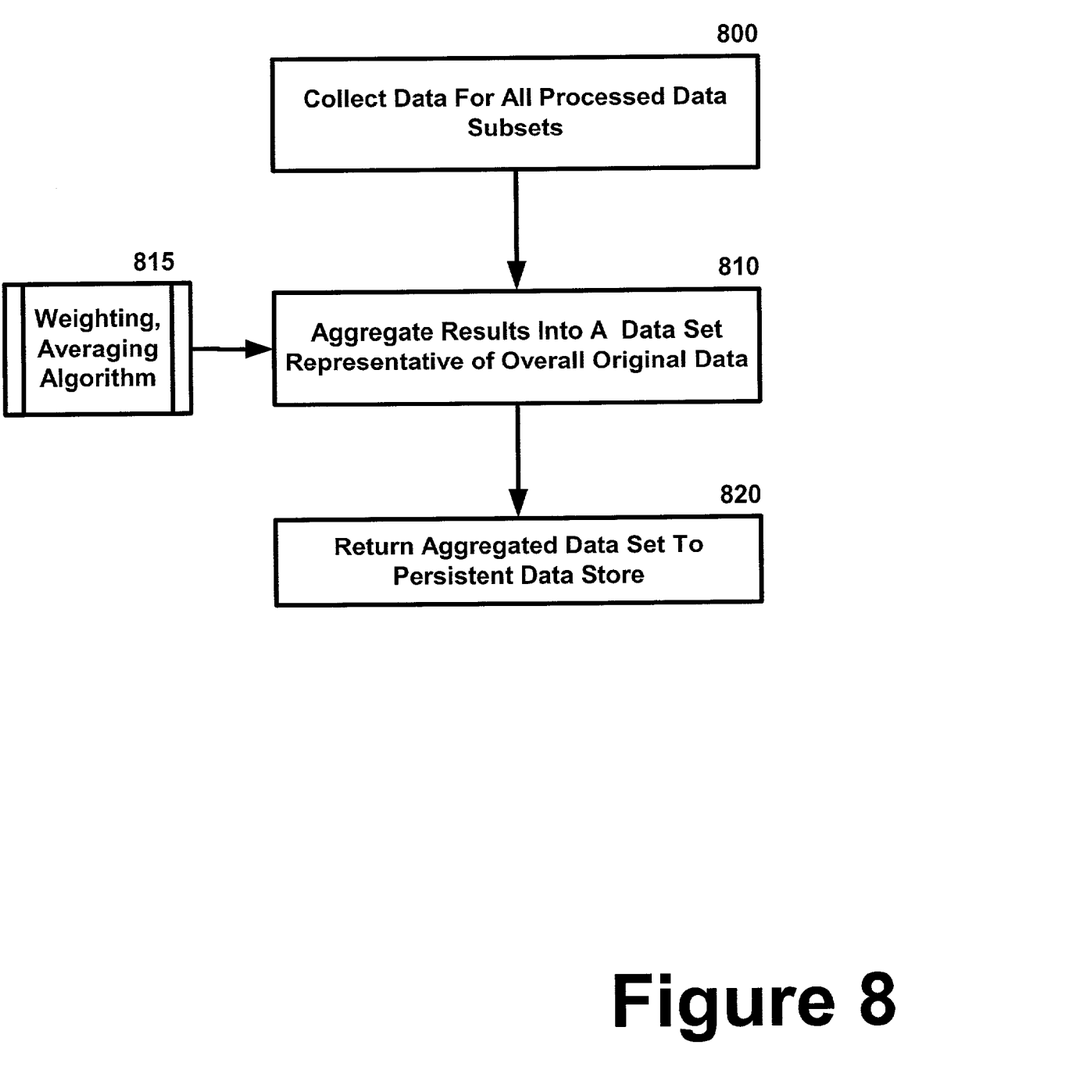
FIG. 8 is a flowchart of the processing performed to aggregate DSP processed data to create a persistent data store of DSP processed media entities in accordance with the present invention.

FIG. 8 is a flowchart illustrating in more detail the processing performed when aggregating DSP processed data for storage in a cooperating persistent data store. As shown, processing begins at block 800 where the data is collected for all processed data subsets. From there the DSP processed data is aggregated at block 810 into a data set that is representative of the overall original data. As shown, processing block 810 cooperates with weighting/averaging algorithm 815 when aggregating the data. The aggregated data set is then stored in persistent data store 820.

As mentioned above, the media contemplated by the present invention in all of its various embodiments is not limited to music or songs, but rather the invention applies to any media to which a classification technique may be applied that merges perceptual (human) analysis with acoustic (DSP) analysis for increased accuracy in classification and matching.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention. For example, the storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of music data, one skilled in the art will recognize that the present invention is not limited to music, and that the methods of tailoring media to a user, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

What is claimed is:

1. A method for creating a rule for classifying media entities comprising the steps of:

identifying media entity data corresponding to the media entities in a database for DSP processing;

processing said identified media entity data to create DSP processed media entity data, the processing comprising determining activity within a frequency range for each of the media entities;

programmatically classifying each of the media entities based on the activity within the frequency range for each of the media entities;

receiving a human classification of each of the media entities, the human classification being performed by a human;

identifying a pre-determined threshold number of matching media entities that have both identical human classifications and identical programmatic classifications; and responsively generating the rule that the programmatic classification for the matching media entities is equivalent to the human classification for the matching media entities.

2. The method of claim 1 wherein said identifying media entity data comprises the steps of:

communicating with at least one data store having DSP unprocessed media entity data;

generating data identifying information about said unprocessed media entity data; and communicating said generated data identifying information for use in DSP processing.

3. The method of claim 1 wherein said processing step comprises the steps of:

receiving DSP unprocessed media entity data;

segmenting said DSP unprocessed media entity data for processing; and spawning at least one DSP process performing DSP functions and operations on said DSP unprocessed media entity data to produce DSP processed data.

4. The method of claim 3 further comprising the step of copying data from a media entity data store having DSP unprocessed media entity data to at least one portion of a computing environment performing DSP processing.

5. The method of claim 4 further comprising the step of converting said unprocessed media entity data into a format consistent with DSP processing.

6. The method of claim 5 further comprising the step of deleting the originally copied data once said converting is completed.

7. The method of claim 3 further comprising the step of collecting said DSP processing data for storage in a persistent DSP processed media entity data store.

8. The method of claim 1, further comprising the steps of:

collecting data for all DSP processed media entities;

sorting said collected data to create an aggregated DSP processed data set representative of the currently amended data, said sorting employing at least one weighting and/or averaging algorithm to realize sorting;

storing said created aggregated DSP processed media entity data set in a persistent data store.

9. A computing device comprising means for carrying out each of the steps of the method of claim 1.

10. A system for creating a rule for classifying media entities comprising:

a media entity identification system that operates on at least one cooperating data store having DSP unprocessed media entities to identify DSP unprocessed media entities;

a DSP processing system receiving said DSP unprocessed media entities and performing DSP processing on said DSP unprocessed media entities to generate DSP processed media entities, the DSP processing comprising determining activity within a frequency range, the DSP processing system further programmatically classifying said DSP processed media entities based, at least in part, on the activity within the frequency range; and a machine learning system that receives a human classification of each of the media entities, identifies a pre-determined threshold number of matching media entities that have both identical human classifications and identical programmatic classifications, and responsively generates the rule that the programmatic classification for the matching media entities is equivalent to the human classification for the matching media entities.

11. The system recited in claim 10, wherein said DSP processing system comprises a at least two computer servers capable of executing distributed automated DSP processing processes.

12. The system recited in claim 11, wherein said DSP processing system spawns at least one DSP process on one of said at least two computer servers to process said DSP unprocessed media entity data, said DSP process converting said DSP unprocessed media entity data to a data format consistent with DSP processing.

13. The system recited in claim 10, wherein said identification system generates identification information about DSP unprocessed media entities for communication to said DSP processing system.

14. The system recited in claim 13, wherein said DSP processing system employs said generated identification information to retrieve DSP unprocessed media entity data from said cooperating data store having said DSP unprocessed media entity data.

15. The system as recited in claim 10, further comprising a communication means for communicating said DSP unprocessed media entity data from said DSP unprocessed media entity data store.

16. The system as recited in claim 10, further comprising an aggregation system that comprises at least one weighting and/or averaging algorithm for use when aggregating said DSP processed media entities.

17. A computer readable storage medium having stored thereon computer executable instructions for performing the steps of:

identifying media entity data corresponding to media entities in a database for DSP processing;

processing said identified media entity data to create DSP processed media entity data, the processing comprising determining activity within a frequency range for each of the media entities;

programmatically classifying each of the media entities based on the activity within the frequency range for each of the media entities;

receiving a human classification of each of the media entities, the human classification being performed by a human;

identifying a pre-determined threshold number of matching media entities that have both identical human classifications and identical programmatic classifications; and responsively generating the rule that the programmatic classification for the matching media entities is equivalent to the human classification for the matching media entities.

18. The computer readable storage medium of claim 17 wherein said processing step comprises the steps of:

receiving DSP unprocessed media entity data;

segmenting said DSP unprocessed media entity data for processing; and spawning at least one DSP process performing DSP functions and operations on said DSP unprocessed media entity data to produce DSP processed data.

19. The computer readable storage medium of claim 18 having stored thereon further computer executable instructions for copying data from a media entity data store having DSP unprocessed media entity data to at least one portion of a computing environment performing DSP processing.

20. The computer readable storage medium of claim 19 having stored thereon further computer executable instructions for converting said unprocessed media entity data into a format consistent with DSP processing.

* * * * *